US009276742B1

(12) United States Patent
Krishnan et al.

(10) Patent No.: US 9,276,742 B1
(45) Date of Patent: *Mar. 1, 2016

(54) UNIFIED STORAGE AND MANAGEMENT OF CRYPTOGRAPHIC KEYS AND CERTIFICATES (71) Applicant: International Business Machines Corporation, Armonk, NY (US)

(72) Inventors: Subramanian Krishnan, Bangalore (IN); Nikunj R. Panchal, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/676,084

(22) Filed: Apr. 1, 2015

Related U.S. Application Data (63) Continuation of application No. 14/496,387, filed on Sep. 25, 2014.

(51) Int. Cl.
*G06F 9/45* (2006.01)
*H04L 9/08* (2006.01)
*H04L 9/32* (2006.01)

(52) U.S. Cl.
CPC ............. *H04L 9/0894* (2013.01); *H04L 9/3263* (2013.01)

(58) Field of Classification Search
None
See application file for complete search history.

(56) References Cited

U.S. PATENT DOCUMENTS

| | | | | |
|---|---|---|---|---|
| 5,136,707 | A | * 8/1992 | Block | H04Q 3/54516 707/812 |
| 5,509,071 | A | * 4/1996 | Petrie et al. | 705/53 |
| 7,549,174 | B1 | 6/2009 | Falkner et al. | |
| 7,823,190 | B1 | 10/2010 | Kacarov et al. | |
| 8,621,205 | B2 | 12/2013 | Hubbell et al. | |
| 2003/0185397 | A1 | * 10/2003 | Ishiguro | G06F 21/10 380/277 |
| 2005/0169475 | A1 | 8/2005 | Camus et al. | |
| 2006/0053285 | A1 | 3/2006 | Kimmel et al. | |
| 2006/0080409 | A1 | * 4/2006 | Bieber | G06F 8/71 709/220 |

(Continued)

FOREIGN PATENT DOCUMENTS

WO    2013093209 A1    6/2013

OTHER PUBLICATIONS

Björkqvist et al., "Design and Implementation of a Key-Lifecycle Management System", IBM Research, Mar. 23, 2010, pp. 1-21.
"IBM WebSphere Cast Iron Hypervisor Edition V7.0 delivers rapid cloud integration", IBM United States Software Announcement 213-421, dated Oct. 15, 2013, pp. 1-13.
"IBM WebSphere Cast Iron Version 7.0 Information Center", IBM, Last updated: Nov. 13, 2013, Copyright IBM Corporation 2003, 2013, <http://pic.dhe.ibm.com/infocenter/wci/v7r0m0/topic/com.ibm.wci.home.doc/infocenter_homepage/ic_home.html>.

(Continued)

*Primary Examiner* — Chameli Das
(74) *Attorney, Agent, or Firm* — Stephen R. Yoder (57) ABSTRACT

Cryptographic resources, such as those including PGP keys and certificates, are transformed such that they are understood by certificate repositories, such as in a format understood by the Java JAVA tools of JAVA KEYSTORE (JKS). JAVA is one example of a general-purpose computer programming language that is concurrent, class-based, object-oriented. JAVA KEYSTORE is one example of a repository of security certificates, such as authorization certificates and public key certificates, used for instance in SSL encryption. The transformation of the cryptographic resources is completed such that the necessary metadata for retrieving the original cryptographic resources, or artifacts thereof, are retained. In that way, cryptographic resources are effectively hidden within the certificate repository until needed. The security program applies an algorithm to generate keys for JKS storage such that the keys "masquerade" in a JKS canonical format until the time in which the resources are needed to be in a PGP canonical format.

6 Claims, 7 Drawing Sheets

(56) References Cited

U.S. PATENT DOCUMENTS

| | | |
|---|---|---|
| 2006/0218400 A1 | 9/2006 | Kimmel et al. |
| 2007/0116282 A1* | 5/2007 | Hawkes et al. ............... 380/239 |
| 2007/0180509 A1* | 8/2007 | Swartz et al. .................... 726/9 |
| 2008/0123855 A1* | 5/2008 | Thomas ........................ 380/277 |
| 2008/0273706 A1 | 11/2008 | Noll |
| 2012/0170750 A1 | 7/2012 | Orsini et al. |
| 2013/0097425 A1 | 4/2013 | Almandos et al. |
| 2013/0163755 A1* | 6/2013 | Nagai ................... H04L 9/0822 380/44 |
| 2014/0324865 A1* | 10/2014 | Mizutani ............... G06F 11/079 707/737 |
| 2014/0337624 A1* | 11/2014 | Savage et al. ................. 713/168 |
| 2014/0369498 A1 | 12/2014 | Hammersmith |
| 2015/0095999 A1* | 4/2015 | Toth ................................. 726/6 |
| 2015/0121063 A1* | 4/2015 | Mailer et al. .................. 713/153 |

OTHER PUBLICATIONS

"IBM Websphere DataPower Cast Iron Appliance XH40 firmware V7.0 delivers rapid cloud integration", IBM United States Hardware Announcement 113-175, dated Oct. 15, 2013, pp. 1-11.

"Pretty Good Privacy", Wikipedia, the free encyclopedia, page last modified May 30, 2014, <http://en.wikipedia.org/wiki/Pretty_Good_Privacy>.

"Transport Layer Security", Wikipedia, the free encyclopedia, page last modified May 30, 2014, <http://en.wikipedia.org/wiki/Secure_Sockets_Layer>.

U.S. Appl. No. 14/496,387, filed Sep. 25, 2014; Entitled "Unified Storage and Management of Cryptographic Keys and Certificates".

Appendix P: List of IBM Patents or Patent Applications Treated As Related, Apr. 1, 2015, pp. 1-2.

* cited by examiner

UNIFIED STORAGE AND MANAGEMENT OF CRYPTOGRAPHIC KEYS AND CERTIFICATES

FIELD OF THE INVENTION

The present invention relates generally to the field of data security, and more particularly to storage and management of cryptographic resources.

BACKGROUND OF THE INVENTION

Regulations and standards are in place which mandate that data is secure and make business transactions subject to compliance of these standards and regulations. The peripheral component interconnect (PCI) standard is one such example from the finance domain. Cryptographic protocols such as secure sockets layer (SSL) and transport layer security (TLS) provide security for data in transit over the internet. Pretty good privacy (PGP) is a cryptographic resource used for securing both data at rest as well as data in transit and it also needs an underlying key infrastructure. There are tools and libraries to generate and manage SSL keys and certificates, and tools and libraries to generate and manage PGP keys and certificates, also referred to herein as cryptographic artifacts.

SUMMARY

In one aspect of the present invention, a method, a computer program product, and a system includes: receiving a cryptographic resource including a first artifact in a first format having a metadata set, converting the first artifact to a second artifact having a second format, storing the second artifact in a repository, and responsive to a request for the first artifact, creating a third artifact based on the second artifact. The first artifact cannot be stored in the repository in the first format. The second artifact in the second format retains the metadata set of the first artifact. The third artifact is a functional copy of the first artifact.

DETAILED DESCRIPTION

Cryptographic resources, such as those including PGP keys and certificates, are transformed such that they are understood by certificate repositories, such as in a format understood by the JAVA tools of JAVA KEYSTORE (JKS). JAVA is one example of a general-purpose computer programming language that is concurrent, class-based, object-oriented. JAVA KEYSTORE is one example of a repository of security certificates, such as authorization certificates and public key certificates, used for instance in SSL encryption. The transformation of the cryptographic resources is completed such that the necessary metadata for retrieving the original cryptographic resources, or artifacts thereof, are retained. In that way, cryptographic resources are effectively hidden within the certificate repository until needed. The security program applies an algorithm to generate keys for JKS storage such that the keys "masquerade" in a JKS canonical format until the time in which the resources are needed to be in a PGP canonical format. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
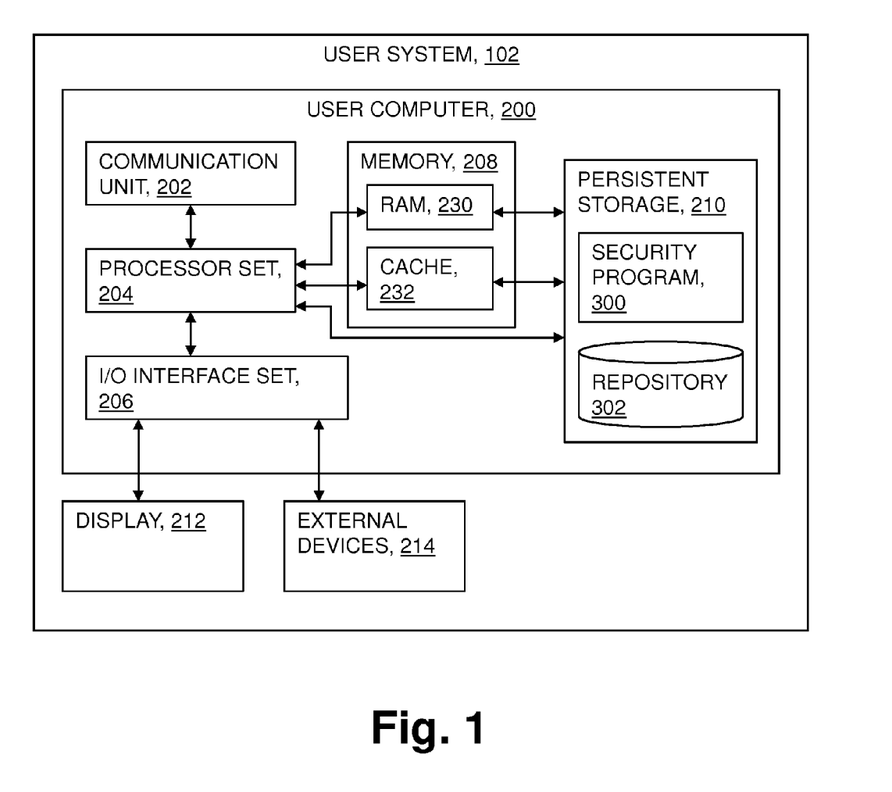
FIG. 1 is a schematic view of a first embodiment of a system according to the present invention.

The present invention will now be described in detail with reference to the Figures. FIG. 1 is a functional block diagram illustrating various portions of user computer system 102, in accordance with one embodiment of the present invention, including: user computer 200; communication unit 202; processor set 204; input/output (I/O) interface set 206; memory device 208; persistent storage device 210; display device 212; external device set 214; random access memory (RAM) devices 230; cache memory device 232; security program 300; and certificate repository 302.

Sub-system 102 may be a laptop computer, tablet computer, netbook computer, personal computer (PC), a desktop computer, a personal digital assistant (PDA), a smart phone, or any programmable electronic device. Program 300 is a collection of machine readable instructions and/or data that is used to create, manage, and control certain software functions that will be discussed in detail below.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
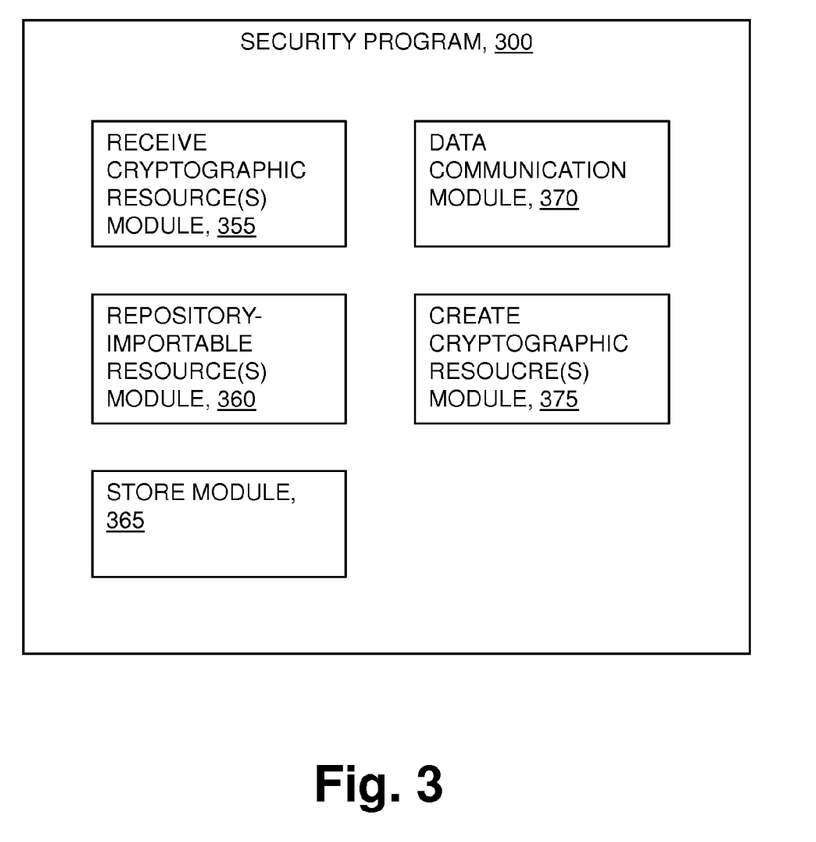
FIG. 3 is a schematic view of a machine logic (for example, software) portion according to an embodiment of the present invention for performing the method shown in FIG. 2.

Security program 300 operates to generate cryptographic resources, such as PGP keys and certificates, in formats understood by PGP tools and/or JKS tools according to the process at hand. That is, the security program "masquerades" cryptographic resources in formats other than PGP canonical format, such as a JKS canonical format, until the time in which the resources are needed to be in the PGP canonical format.

Figure 2:
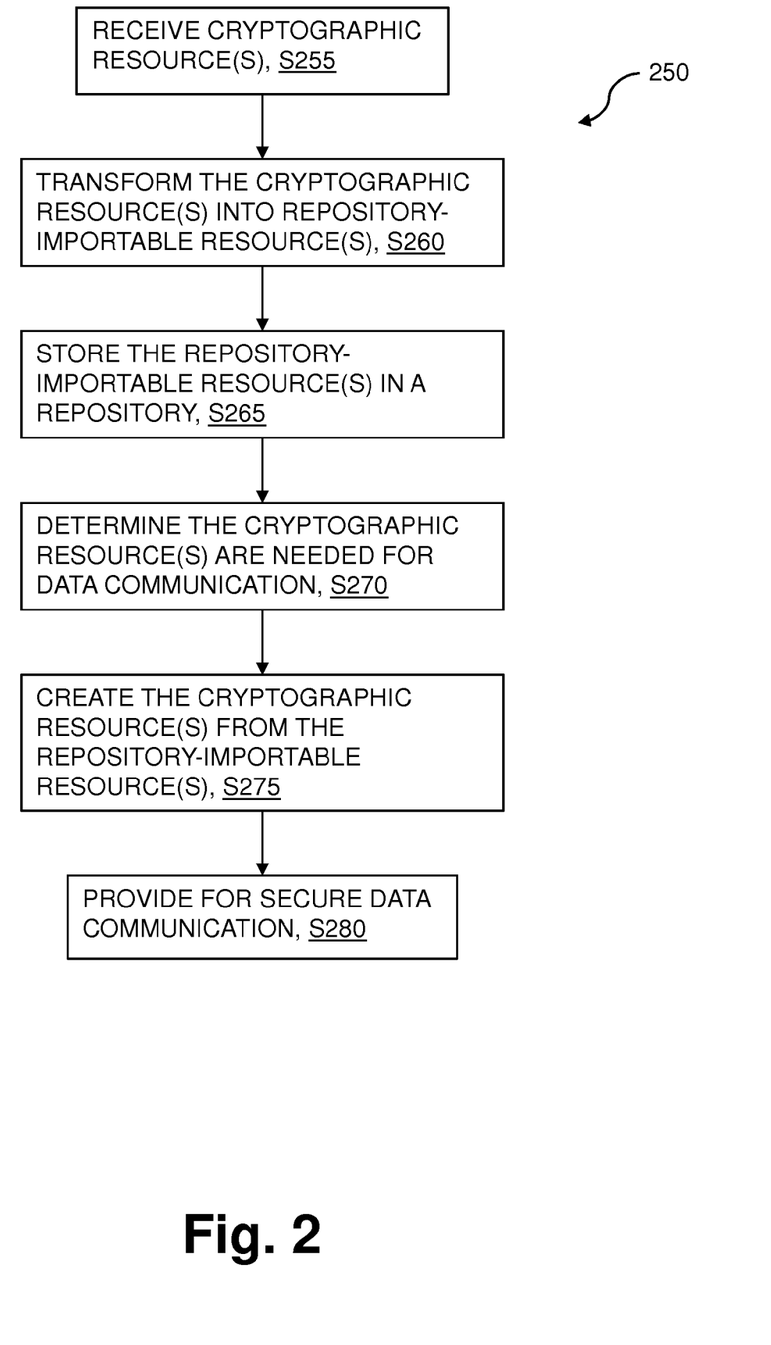
FIG. 2 is a flowchart showing a first method performed, at least in part, by the first embodiment system.

FIG. 2 shows a flowchart depicting process 250, according to the present invention. FIG. 3 shows security program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing beings with step S255, where receive cryptographic resource(s) module ("mod") 355 receives cryptographic resource(s). A PGP key is an example of a cryptographic resource. The PGP key and certificate may be provided by a user or by a program for which encrypted data communication is desired. Regardless of the source of the cryptographic resource, this resource is oftentimes formatted for active use in secure data communication. In this example, the cryptographic resource is received in this "active use" format. Specifically, the cryptographic resource is a PGP key and certificate in a canonical format understood by PGP tools. Alternatively, the received cryptographic resource is in another format for use in secure data communication.

Processing proceeds to step S260, where repository-importable resource(s) module 360 transforms the cryptographic resource(s) into repository-importable resource(s). This transformation is achieved by reformatting the received cryptographic resource. In this example, the repository-importable resource(s) are formatted for storage in a JAVA KEY STORE (JKS), shown generically as repository 302 in FIG. 1. JAVA is one example of a general-purpose computer programming language that is concurrent, class-based, object-oriented. JAVA KEYSTORE is one example of a repository of security certificates, such as authorization certificates and public key certificates, used for instance in SSL encryption. (Note: the term(s) "JAVA," "KEYSTORE," and/or "JKS" may be subject to trademark rights in various jurisdictions throughout the world and are used here only in reference to the products or services properly denominated by the marks to the extent that such trademark rights may exist.) That is, the cryptographic resource(s) received in step S255 is formatted to a canonical format understood by certificate repository tools. Alternatively, the cryptographic resource(s) are formatted to a format understood by other repositories. It should be noted that the process of converting a PGP certificate to a format understood by certificate repository tools is a "loss-less" format change. By loss-less, there is no loss of metadata that may later prevent retrieval of the original PGP certificate. The process of converting from PGP to certificate repository is discussed in more detail below.

Processing proceeds to step S265, where store module 365 stores the repository-importable resource(s) in a repository 302. By storing the repository-importable resource(s), the original cryptographic resource(s) appears to be a mere repository item instead of a cryptographic resource(s). It may be said that the cryptographic resource(s) masquerades as a repository item. Further, the re-formatted certificate or key does not appear to be what it was originally, or could become later.

Processing proceeds to step S270, where data communication module 370 determines that the cryptographic resource(s) are needed for data communication. For example, whenever there is a request to perform a PGP cryptographic operation (such as encryption or decryption), the data communication module determines that the resources are needed and triggers the pointer/handle to the item required for the operation. Alternatively, the pointer/handle is triggered otherwise via the process of requesting the operation to be performed.

Processing proceeds to step S275, where create cryptographic resource(s) module 375 creates the cryptographic resource(s) from the repository-importable resource(s). Upon determination of a need for the cryptographic resource(s), the repository-importable resource(s) being formatted for storage are reformatted for "active use." In this example, the PGP key and certificate is reconstructed, via reformatting the repository-importable resource(s). Alternatively, a functional copy of the PGP key and certificate is created based on the repository-importable resource(s). As stated above, the transition from one format to the other is a "loss-less" process. It is due to the loss-less process that the reformatted repository-importable resource(s) is understood by PGP tools for use in secure data communication. It should be noted that not every cryptographic resource may be formatted to any other repository-importable format without losing important metadata for later retrieval of the original cryptographic resource.

Processing ends at step S280, where data communication module 370 provides for secure data communication by providing appropriate cryptographic resource(s). In this example, PGP keys and/or certificates are provided upon request by the data communication module.

Some embodiments of the present invention recognize the following facts, potential problems and/or potential areas for improvement with respect to the current state of the art: (i) there is a need for an underlying infrastructure to provide a mechanism to both store and retrieve PGP keys for use by cryptographic protocols such as SSL and TLS; (ii) there is an ever-increasing need for securing enterprise data whether it is data in transit or data at rest; (iii) PGP keys cannot be stored in libraries that work on SSL keys; (iv) PGP keys cannot be stored in libraries that work on cryptographic certificates; (v) PGP keys cannot be manipulated by tools that work on SSL keys; (vi) PGP keys cannot be manipulated by tools that work on cryptographic certificates; (vii) conventional systems have to manage two separate repositories all the time; (viii) conventional solutions are complex, entailing lots of development, testing, documentation, and/or maintenance effort; and/or (ix) it is possible to convert PGP keys and/or certificates to a repository-recognized format without losing important metadata that allows later retrieval of the original PGP keys and/or certificates.

By way of example, there is an application runtime, or run-time system, which allows applications running in it to use SSL keys and certificates. The run-time system typically includes the following: (i) an underlying repository for persistence (this could be a file, a database, an xml, a flat file, a standard format, or something proprietary); (ii) a command line tool to add/remove/fetch/edit/list keys from this repository implementation; (iii) a graphical user interface (GUI) to do the same operations as the command list table (CLT), but in a more intuitive and user-friendly way; and/or (iv) application programming interfaces (APIs) in different supported programming languages to manage and/or access the keys. The applications running on the run-time system use the APIs to access the keys and certificates whereas the GUI and CLT are mostly used by human users of the run-time system. For a run-time system that supports SSL keys and certificates, such as the one in this example, when a need arises to allow other applications to make use of PGP keys and certificates, there are conventionally two options available to the user: (i) extend the repository, CLT, GUI, and APIs to work for PGP keys and certificates; and/or (ii) implement a separate repository, CLT, GUI, and APIs for PGP keys and certificates. It should be noted that some embodiments of the present invention apply to the generic version of the keys and/or certificates that can be imported into any repository. The PGP keys and/or certificates are formatted to be understood by repository tools.

Some embodiments of the present invention do not change the existing CLTs, APIs, GUIs, and repository when confronted with two or more applications that make use of the same PGP keys and certificates. Some embodiments of the present invention use a loss-less approach where a PGP key masquerades as a non-PGP key until the time in which the PGP key is actually to be used as a PGP key. At that time, the key or certificate is re-converted to a PGP key. To accomplish this, two new system components, or software modules, are inserted at the appropriate positions in the architecture. In the example that follows, specific application of the present invention for handling PGP keys and certificates for storage in a repository is described. Accordingly, asymmetric key algorithms are employed and a key pair is obtained and transformed in the discussion below.

Figure 4:
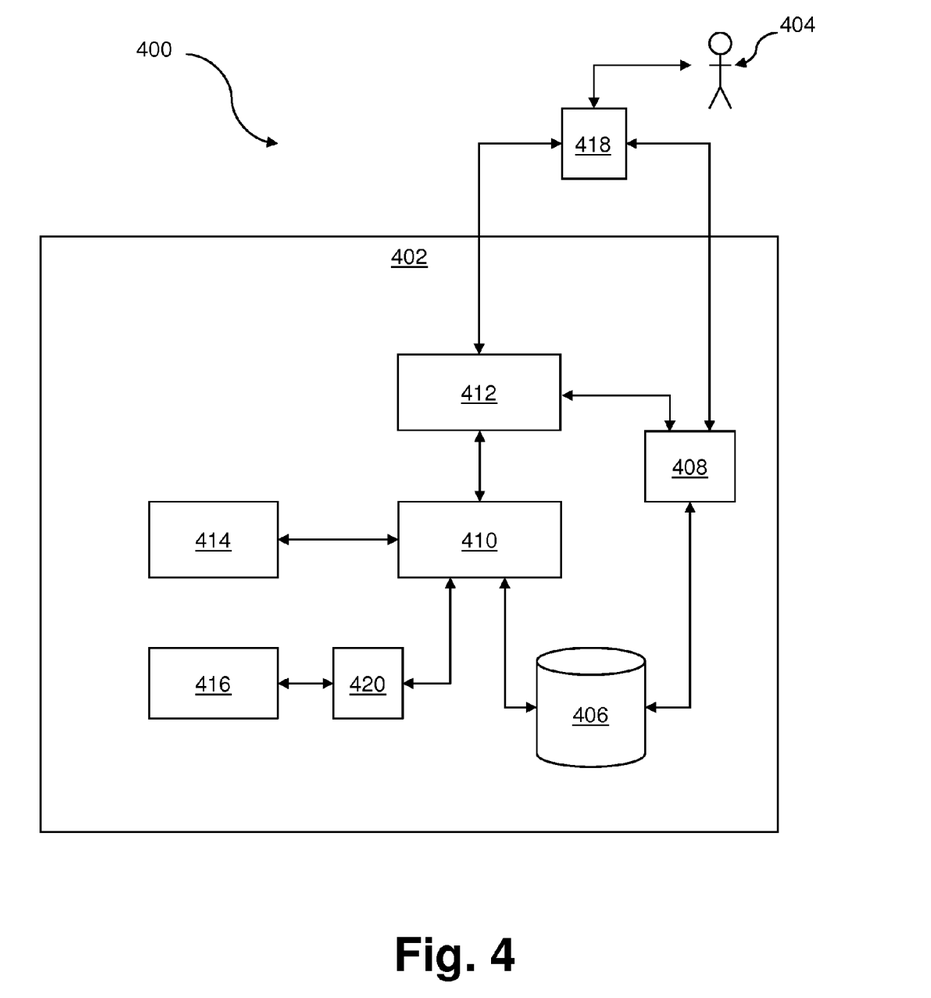
FIG. 4 is a schematic view of a second embodiment of a system according to the present invention.

FIG. 4 is a functional block diagram illustrating various portions of user computer system 400, in accordance with one embodiment of the present invention. In this example block diagram a JAVA KEYSTORE repository is illustrated in the user computer system 400 including: user computer 402; user 404; JAVA KEYSTORE 406; command line tool (CLT) 408; interface set (GUI) 412; application programming interface (API) 410; application programs 414, 416; converter program 418; and re-converter program 420.

Converter program 418, also referred to as "repono" operates to convert PGP keys and certificates into a canonical format understood by JAVA KEYSTORE 406 and imports it into the JAVA KEYSTORE. Once this action is taken, the existing GUI, CLT, and/or APIs can be used to operate on the keys. Some embodiments of the present invention implement the converter program according to the flowchart shown in FIG. 5.

Figure 5:
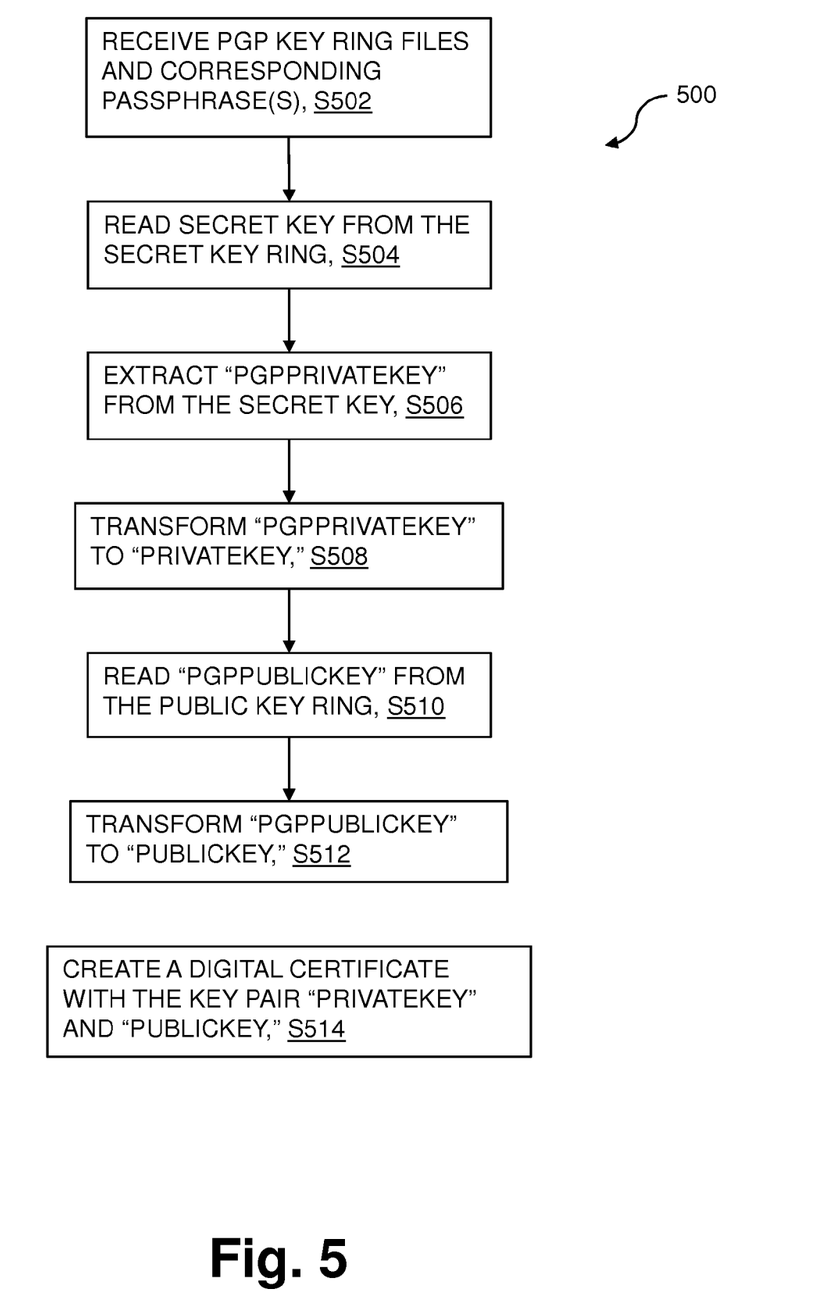
FIG. 5 is a flowchart showing a second method performed, at least in part, by the second embodiment system.

FIG. 5 shows flowchart 500 depicting a method performed by converter program 418, according to an embodiment of the present invention.

Processing begins at step S502, where a number of PGP key ring files and a corresponding passphrase are received by converter program 418 as input. In this example, the PGP key ring files and corresponding passphrase are received as user input. Alternatively, the files and passphrase are received automatically via an auxiliary process initiated by a user.

Processing proceeds to step S504, where converter program 418 iterates through the secret key ring to identify and read the secret key into memory. As stated above, the secret key is formatted such that it is understood by PGP tools.

Processing proceeds to step S506, where converter program 418 extracts a "PGPPrivateKey" from the secret key. Having extracted the PGPPrivateKey, a process may be applied, as follows to convert this key to one understood by a JAVA tool.

Processing proceeds to step S508, where converter program 418 converts the "PGPPrivateKey" to a "PrivateKey." PrivateKey is a key having a format recognized by JAVA tools such that the PrivateKey may be stored in a repository, such as JAVA KEYSTORE.

Processing proceeds to step S510, where converter program 418 iterates through the public key ring to identify and read "PGPPublicKey" into memory. The PGPPublicKey is the second key of the pair of keys associated with a corresponding asymmetric key algorithm.

Processing proceeds to step S512, where converter program 418 converts the "PGPPublicKey" to "PublicKey." PublicKey is a key having a format recognized by JAVA tools such that the PublicKey may be stored in JAVA KEYSTORE 406. In some embodiments of the present invention, the PGP certificate is used as the basis for building an SSL certificate, the SSL certificate including the necessary metadata to retrieve the PGP certificate.

Processing ends at step S514, where converter program 418 creates a certificate (e.g. digital certificate and identity certificate) containing the converted key pair, PrivateKey and PublicKey, and stores that certificate in JAVA KEYSTORE 406. In this embodiment, the converter program uses "X509v3CertificateBuilder" to create the certificate. Alternatively, another certificate creator is used to create a certificate that is a functional copy of the PGP certificate and/or key. Alternatively, the stored SSL certificate and/or key is converted into a PGP certificate and/or key, removing the SSL certificate and/or key from storage.

In this example, in order for the X509 certificate builder to consume the PGP certificates and/or keys information from the input PGP certificates and/or keys are extracted to create intermediate artifacts. These intermediate artifacts are provided as consumable input to the X509 certificate builder.

Figure 6:
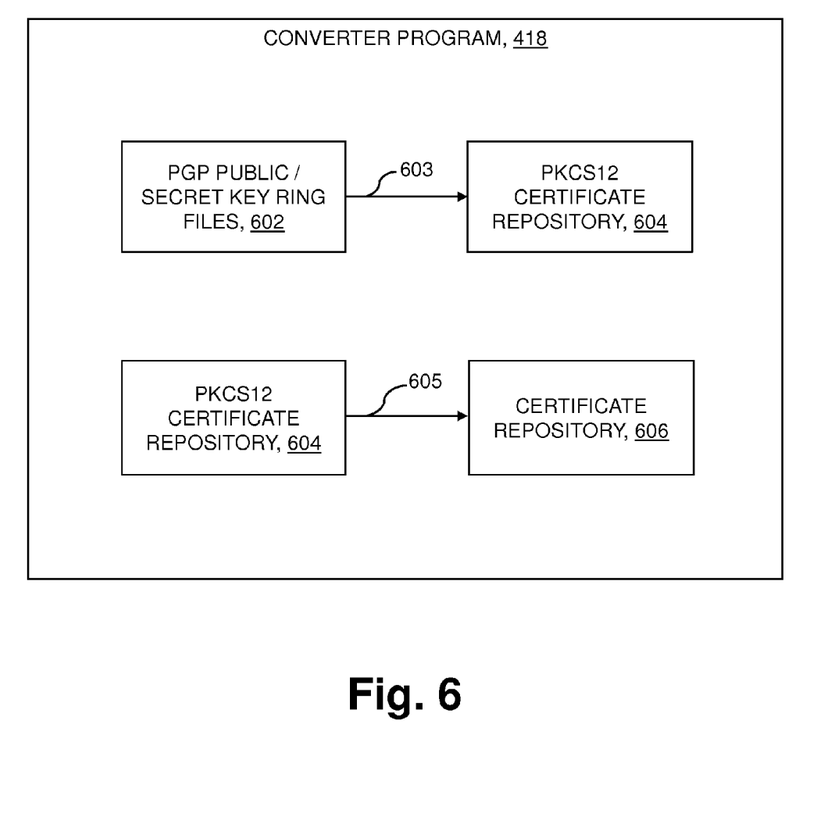
FIG. 6 is a schematic view of a machine logic (for example, software) portion according to an embodiment of the present invention for performing the method shown in FIG. 3.

FIG. 6 is an exemplary implementation of converter program 418 as a utility, using generic references. The utility 603 within the converter program, which may be referred to as "extractPKCS12AndPublicKey," helps convert the PGP keys 602 to a PKCS12 format, stored in certificate repository 604 for repository export, which can be imported into any certificate repository 606. Providing a few details in the parameters including: (i) the secret/public key ring file location; (ii) passphrase; and/or (iii) issuer details. The utility 605 within converter program, which may be referred to as "importPKCS12IntoJKS," helps import the extracted PKCS12 certificate repository 604 into a certificate repository 606.

Re-converter program 420, also referred to as "accio," operates to re-convert the Key/Certificate in a canonical format understood by JAVA KEYSTORE back to a PGP Key/Certificate in a canonical format understood by PGP tools for use in PGP applications. Some embodiments of the present invention implement the re-converter program according to the flowchart shown in FIG. 7.

Figure 7:
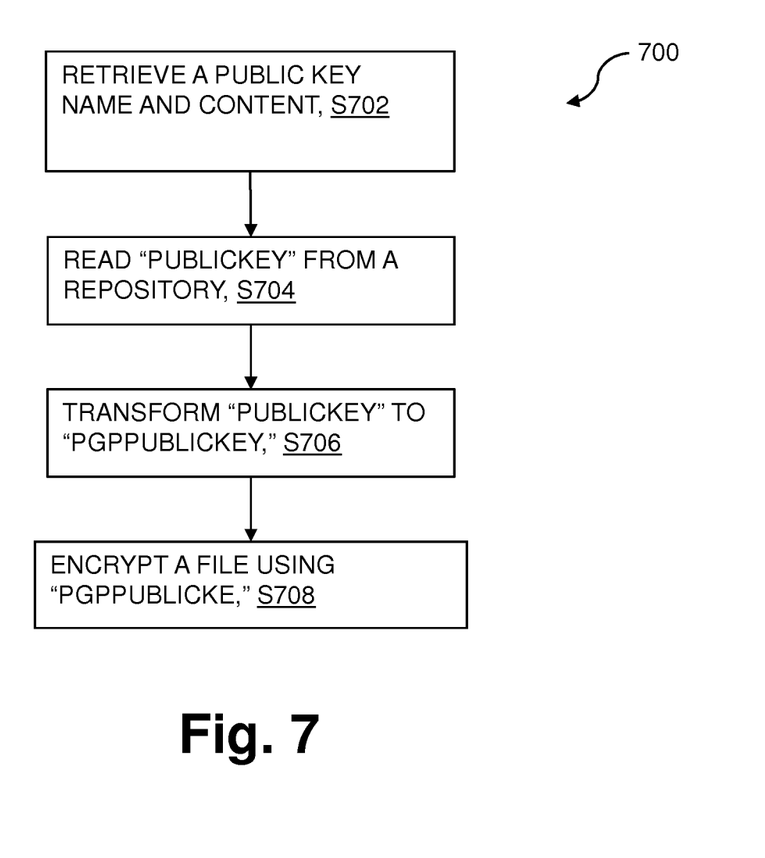
FIG. 7 is a flowchart showing a third method performed, at least in part, by the second embodiment system.

FIG. 7 shows flowchart 700 depicting a method performed by re-converter program 420, according to an embodiment of the present invention.

Processing begins at step S702, where re-converter program 420 retrieves a public key name and content from the JAVA KEYSTORE (created in step S512, above).

Processing proceeds to step S704, where re-converter program 420 reads "PublicKey" from the JAVA KEYSTORE to convert it back to "PGPPublicKey" format. Referring back to FIG. 5, step S512, where "PGPPublicKey" is transformed to "PublicKey," the transformation from a PGP key to a public key that may be stored in JAVA KEYSTORE is a "loss-less" process, such that the metadata is preserved sufficiently to revert back to a useful PGP key, "PGPPublicKey."

Processing proceeds to step S706, where re-converter program 420 transforms, or "re-converts," the public key back to the original PGP key. Because of the loss-less process mentioned above, "PublicKey" is effectively restored to the original "PGPPublicKey" read into memory in step S510 of FIG. 5.

Processing ends at step S708, where re-converter program 420 encrypts a target file using the "PGPPublicKey." Alternatively, having a PGP key and certificate produced according to step S706, a user is free to take any actions that may be performed using the PGP key and certificate as if the PGP key and certificate had never been transformed. Actions include: (i) encryption; (ii) decryption; (iii) signing; and (iv) verification.

Some embodiments of the present invention can be implemented within only 16 percent of the development time required for some conventional approaches. The efficiency for these embodiments is due to the fact that only the converter and the re-converter need to be developed. Conventionally, either the entire repository as well as the tooling must be re-implemented for the runtime system from scratch, or else the existing repository and tooling must be enhanced to work for PGP keys. Both of these alternative, conventional approaches are non-trivial and need more development and test time than some embodiments of the present invention. For example, in a backup scenario where all configuration files and data are to be backed up and restored later, some embodiments of the present invention do not require additional actions to be performed to backup and restore the PGP keys. Otherwise, the backup and restore mechanism must be re-implemented for PGP keys.

Some embodiments of the present invention operate to perform the following actions: (i) convert the PGP key(s) and certificate(s) into a canonical format for storage in repository; (ii) retrieve those converted PGP key(s) and certificate(s), as needed; and (ii) convert the PGP key(s) and certificate(s) back to a functional format in time for use.

Some embodiments of the present invention generate a new name for the key alias used for PGP encryption/decryption (through, for example, a pseudo-random or deterministic algorithm) while storing the key in a repository. Then, using the same name generation technique, the key is accessed from the repository before converting it back to PGP key format.

Some embodiments of the present invention convert a PGP key to masquerade as a non-PGP key until a time when the non-PGP key actually needs to be used as a PGP key. At that point the non-PGP key is returned to a PGP key format.

Some embodiments of the present invention may include one, or more, of the following features, characteristics, and/or advantages: (i) no need to support multiple data formats (the PGP keys are converted to the existing data format and stored in the existing repository); (ii) no need to use mutualized interfaces for performing cryptographic functions; (iii) no need for any translation modules that are coded against the mutualized interfaces; (iv) use of existing optimized native interfaces for performing the cryptographic functions at optimal speed; (v) integrates into any existing tooling; (vi) the CLT, GUI, and repository implementation do not have to be re-written; (vi) readily applied by existing users of the runtime system; and/or (vii) no need to change existing components of the runtime system.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
receiving a cryptographic resource including a first artifact in a first format having a first metadata set, the first format being a pretty good privacy (PGP) canonical format;
converting the first artifact to a second artifact having a second format;
storing the second artifact in a repository; and
responsive to a request for the first artifact, creating a third artifact based on the second artifact;

wherein:
the repository cannot store the first artifact, at least in part, because the first artifact is formatted according to the first format;
the second artifact being formatted according to the second format retains the first metadata set of the first artifact;
the repository configured to store the second artifact, at least in part, because the second artifact is formatted according to the second format;
the third artifact is a functional copy of the first artifact, the third artifact functionally replaces the first artifact;
the second format is a standard format of the repository; and
the first format and the second format are distinct formats.

2. The method of claim 1, further comprising:
encrypting a file using the third artifact.

3. The method of claim 1, wherein:
the third artifact is formatted according to the first format;
the third artifact having the first metadata set.

4. The method of claim 1, wherein:
the cryptographic resource is a pretty good privacy (PGP) key ring set;
the first artifact is a PGP key pair including a PGP private key and a PGP public key;
the first format is a PGP format;
the second artifact is a key pair; and
the second format is selected from a group consisting of: a secure socket layer (SSL) protocol and a transport layer security (TLS) protocol.

5. The method of claim 4, further comprising:
extracting the PGP private key from a secret key ring; and
extracting the PGP public key from a public key ring;
wherein:
the step of converting the first artifact to a second artifact having a second format includes building an SSL certificate from a PGP certificate.

6. The method of claim 4, wherein the repository is a JAVA KEYSTORE (JKS) repository.

* * * * *